(12) United States Patent
Shang et al.

(10) Patent No.: US 11,685,686 B2
(45) Date of Patent: Jun. 27, 2023

(54) APPARATUS FOR OPTICAL FIBER MANUFACTURING PROCESS

(71) Applicant: Prime Optical Fiber Corporation, Miao-Li County (TW)

(72) Inventors: Hen-Tai Shang, Miao-Li County (TW); Kuei-Huang Chou, Miao-Li County (TW); Zhao-Ying Chen, Miao-Li County (TW); Chiao-Ling Chen, Miao-Li County (TW)

(73) Assignee: Prime Optical Fiber Corporation, Miao-Li ( * ) Notice: Subject to any disclaimer, the term of this patent is extended or adjusted under 35 U.S.C. 154(b) by 165 days.

(21) Appl. No.: 17/352,090

(22) Filed: Jun. 18, 2021

(65) Prior Publication Data

US 2022/0402802 A1 Dec. 22, 2022

(51) Int. Cl.
*C03B 37/012* (2006.01)
*G02B 6/38* (2006.01)

(52) U.S. Cl.
CPC .. *C03B 37/01222* (2013.01); *C03B 37/01257* (2013.01); *C03B 37/01262* (2013.01); *G02B 6/3833* (2013.01)

(58) Field of Classification Search
CPC .......... C03B 37/0122; C03B 37/01262; C03B 37/01222; C03B 37/0142; C03B 37/01406; C03B 37/012; C03B 37/014; C03B 37/018; C03B 37/0121; G02B 6/3833
See application file for complete search history.

(56) References Cited

U.S. PATENT DOCUMENTS 5,961,682 A * 10/1999 Lee ................... C03B 37/01807
65/390
6,192,713 B1 * 2/2001 Zhang ............... C03B 37/01807
65/390

(Continued)

FOREIGN PATENT DOCUMENTS

CN       1490267 A  *  4/2004  ....... C03B 37/01823
CN    201962200 U  *  9/2011  ....... C03B 37/01807

(Continued)

*Primary Examiner* — Galen H Hauth
*Assistant Examiner* — Steven S Lee
(74) *Attorney, Agent, or Firm* — Lin & Associates Intellectual Property, Inc.

(57) ABSTRACT

An apparatus for optical fiber manufacturing process is provided, including a raw material providing structure, a dopant providing structure, and a preform forming substrate tube. The dopant providing structure is disposed at a downstream side of the raw material providing structure and in communication with the raw material providing structure. The dopant providing structure includes an outer tube, a first inner tube, a first dopant providing container, a second inner tube, and a second dopant providing container. The first inner tube is disposed in the outer tube. The first dopant providing container is disposed in the first inner tube. The second inner tube is disposed in the outer tube at a downstream of the first inner tube. The second dopant providing container is disposed in the second inner tube. The preform forming substrate tube is disposed at a downstream side of the dopant providing structure.

11 Claims, 5 Drawing Sheets

(56) References Cited

U.S. PATENT DOCUMENTS

| | | | | |
|---|---|---|---|---|
| 6,715,441 B2 * | 4/2004 | Breuls | ............... | H01J 37/32192 427/575 |
| 7,181,116 B2 * | 2/2007 | Sigel, Jr. | ............... | C03C 13/045 65/413 |
| 8,826,699 B2 * | 9/2014 | Hartsuiker | .......... | C03B 37/0183 65/420 |
| 2002/0078714 A1 * | 6/2002 | Bird | ................. | C03B 37/01406 65/427 |
| 2004/0042726 A1 * | 3/2004 | Kersey | ............. | C03B 37/01211 385/27 |
| 2005/0069638 A1 * | 3/2005 | Rajala | ................. | C03C 25/607 427/163.2 |
| 2005/0120752 A1 * | 6/2005 | Brown | ................ | C03B 37/0142 65/413 |
| 2011/0132038 A1 * | 6/2011 | Dawes | ............. | C03B 37/01282 65/408 |
| 2013/0273248 A1 * | 10/2013 | Haemmerle | ...... | C03B 37/01815 118/725 |
| 2016/0075590 A1 * | 3/2016 | Gonda | .............. | C03B 37/01222 65/409 |
| 2018/0282199 A1 * | 10/2018 | Cocchini | ........... | C03B 37/01473 |

FOREIGN PATENT DOCUMENTS

| | | | | |
|---|---|---|---|---|
| CN | 109206007 A | * | 1/2019 | ....... C03B 37/01807 |
| CN | 109231811 A | * | 1/2019 | |
| DE | 3731806 A1 | * | 6/1989 | ....... C03B 37/01869 |
| EP | 0227846 A1 | * | 7/1987 | ........... C03B 37/018 |
| EP | 2206689 B1 | * | 5/2018 | ....... C03B 37/01426 |
| GB | 2117754 A | * | 10/1983 | ....... C03B 37/01815 |
| JP | 2005170759 A | * | 6/2005 | ......... C03B 37/0142 |
| JP | 2012036052 A | * | 2/2012 | ......... C03B 37/0122 |
| KR | 20040051192 A | * | 6/2004 | ....... C03B 37/01406 |

* cited by examiner

APPARATUS FOR OPTICAL FIBER MANUFACTURING PROCESS

BACKGROUND OF THE INVENTION

1. Field of the Invention

The present invention relates generally to an apparatus for optical fiber manufacturing process.

2. The Prior Arts

Optical fibers are widely used. Generally speaking, the method of manufacturing an optical fiber is to first form a preform of the optical fiber, and then draw the preform to form the optical fiber. Nowadays, the methods of forming preforms are mainly divided into four categories, namely, the Outside Vapor Deposition (OVD) method, the Vapor-phase Axial Deposition (VAD) method, and the Modified Chemical Vapor Deposition (MCVD) method, and Plasma-activated Chemical Vapor Deposition (PCVD) method.

Taking the high-temperature process of the MCVD method for producing doped rare-earth metal raw materials as an example, the typical method is to vaporize the basic raw materials formed as glass and the raw materials for dopants, and then pass the gas form through the pipeline to be transported to the main body of the equipment, and then forming the preform for optical fiber in the preform base tube. However, because the temperature along the pipeline must be kept higher than the vaporization temperature, so as to prevent the dopants from condensing in the small pipeline, causing the raw materials of the dopants to be blocked when entering the equipment. In addition, the equipment needs to include a complex rotating seal element. Due to these shortcomings, improvements must be made to enhance the equipment.

SUMMARY OF THE INVENTION

The present invention provides an apparatus for optical fiber manufacturing process, especially an apparatus applicable to optical fiber manufacturing process doped with rare earth metals, which can be used to manufacture optical fiber preforms by a modified chemical vapor deposition method, and at least partially improve the aforementioned shortcomings.

An apparatus for optical fiber manufacturing process according to an embodiment of the present invention includes a raw material providing structure, a dopant providing structure, and a preform forming substrate tube. The dopant providing structure is configured to be disposed at a downstream side of the raw material providing structure and be in communication with the raw material providing structure. The dopant providing structure includes an outer tube, a first inner tube, a first dopant providing container, a second inner tube, and a second dopant providing container. The first inner tube is configured to be disposed in the outer tube. The first dopant providing container is configured to be disposed in the first inner tube. The second inner tube is configured to be disposed in the outer tube at a downstream of the first inner tube. The second dopant providing container is configured to be disposed in the second inner tube. The preform forming substrate tube is configured to be disposed at a downstream side of the dopant providing structure.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

It should be noted that in the following description, when referring to what state a component is "configured to", it particularly refers to the state that the component will present when the apparatus is in use. It is understandable that the present invention allows disassembly and replacement of components, placement of doped materials, and so on, when the equipment is not in use. Therefore, the description of apparatus components with specific technical features does not mean to exclude the aforementioned situations that may occur when the apparatus is not in use, but only requires the mentioned components to show the state defined by the technical features brought out by "configuration" when the apparatus is in use. For example, when it is stated that an element is configured to be arranged on the downstream side of another element, it particularly means that the element is arranged on the downstream side of the other element when the apparatus is in use, but when the apparatus is not in use, the element may not be located on the downstream side of the other element because of the disassembly of the element.

Moreover, the upstream side and the downstream side may be defined by the main flow direction of the gas (especially the gas of the basic raw material forming the glass) in the equipment. The so-called main flow direction here refers to the flow direction of gas in most equipment. Taking FIG. 1 as an example, the gas of the basic raw material forming glass flows from the left side to the right side of the drawing in most equipment. Therefore, the left side of the drawing is defined as the upstream side and the right side is defined as the downstream side. The specific flow direction of the gas in the apparatus 10 for optical fiber manufacturing in FIG. 1 will be described in subsequent paragraphs.

Figure 1:
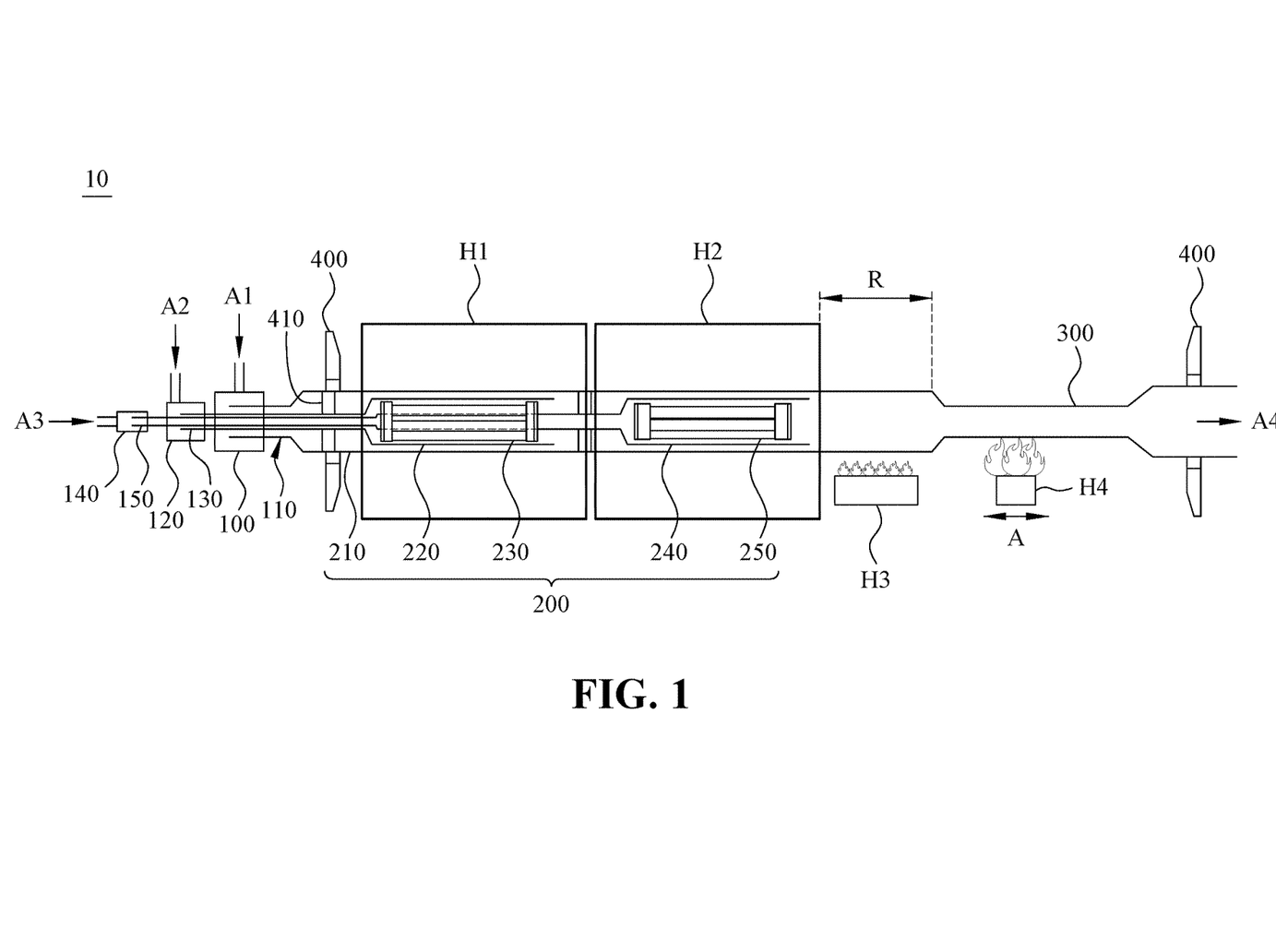
FIG. 1 is a schematic view of an apparatus for optical fiber manufacturing process according to an embodiment of the present invention.

Refer to FIG. 1, which illustrates an apparatus 10 for optical fiber manufacturing process (hereinafter also referred to as apparatus 10) according to an embodiment of the present invention. The apparatus 10 includes a raw material providing structure 100, a dopant providing structure 200, and a preform forming base tube 300. The dopant providing structure 200 is configured to be disposed on the downstream side of the raw material providing structure 100 and communicate with the raw material providing structure 100. The dopant providing structure 200 includes an outer tube 210, a first inner tube 220, a first dopant providing container 230, a second inner tube 240, and a second dopant providing container 250. The first inner tube 220 is configured to be provided in the outer tube 210. The first dopant providing container 230 is configured to be disposed in the first inner tube 220. The second inner tube 240 is configured to be provided in the outer tube 210 and located on the downstream side of the first inner tube 220. The second dopant providing container 250 is configured to be disposed in the second inner tube 240. The preform forming base tube 300 is configured to be disposed on the downstream side of the dopant providing structure 200.

Specifically, the apparatus 10 used in the optical fiber manufacturing process may further include a raw material providing channel 110. The material providing channel 110 connects the raw material providing structure 100 and the outer tube 210 of the dopant providing structure 200. In some embodiments, the raw material providing channel 110, the outer tube 210, and the preform forming base tube 300, and even the outlet section after the preform forming base tube 300, may be integrally formed of quartz, but it is not limited thereto. The apparatus 10 may further include a first carrier gas providing structure 120 and a first carrier gas providing channel 130. The first carrier gas providing channel 130 connects the first carrier gas providing structure 120 and the first inner tube 220 of the dopant providing structure 200. In some embodiments, the first carrier gas providing channel 130 and the first inner tube 220 may be integrally formed of quartz, but are not limited thereto. The apparatus 10 may further include a second carrier gas providing structure 140 and a second carrier gas providing channel 150. The second carrier gas providing channel 150 connects the second carrier gas providing structure 140 and the second inner tube 240 of the dopant providing structure 200. In some embodiments, the second carrier gas providing channel 150 and the second inner tube 240 may be integrally formed of quartz, but are not limited thereto. According to some embodiments, as shown in FIG. 1, the first carrier gas providing structure 120 may be configured to be disposed on the upstream side of the raw material providing structure 100, and the second carrier gas providing structure 140 may be configured to be disposed on the upstream side of the first carrier gas providing structure 120. In this case, the first carrier gas providing channel 130 may be configured to be disposed in the raw material providing channel 110, and the second carrier gas providing channel 150 may be configured to be disposed in the first carrier gas providing channel 130.

Figure 2A:
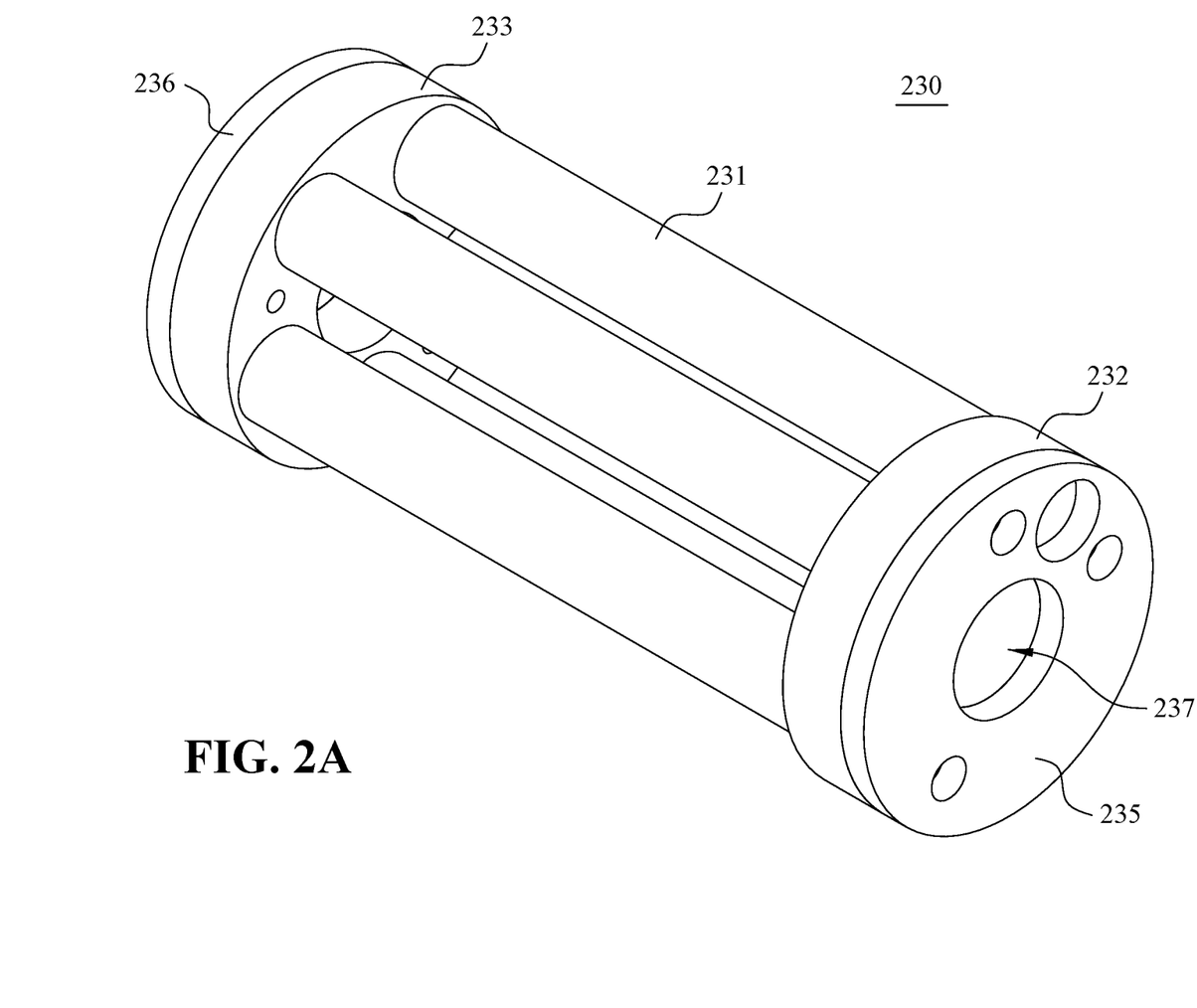
FIGS. 2A and 2B are schematic views of a first dopant providing container according to some embodiments of the present invention.
Figure 2B:
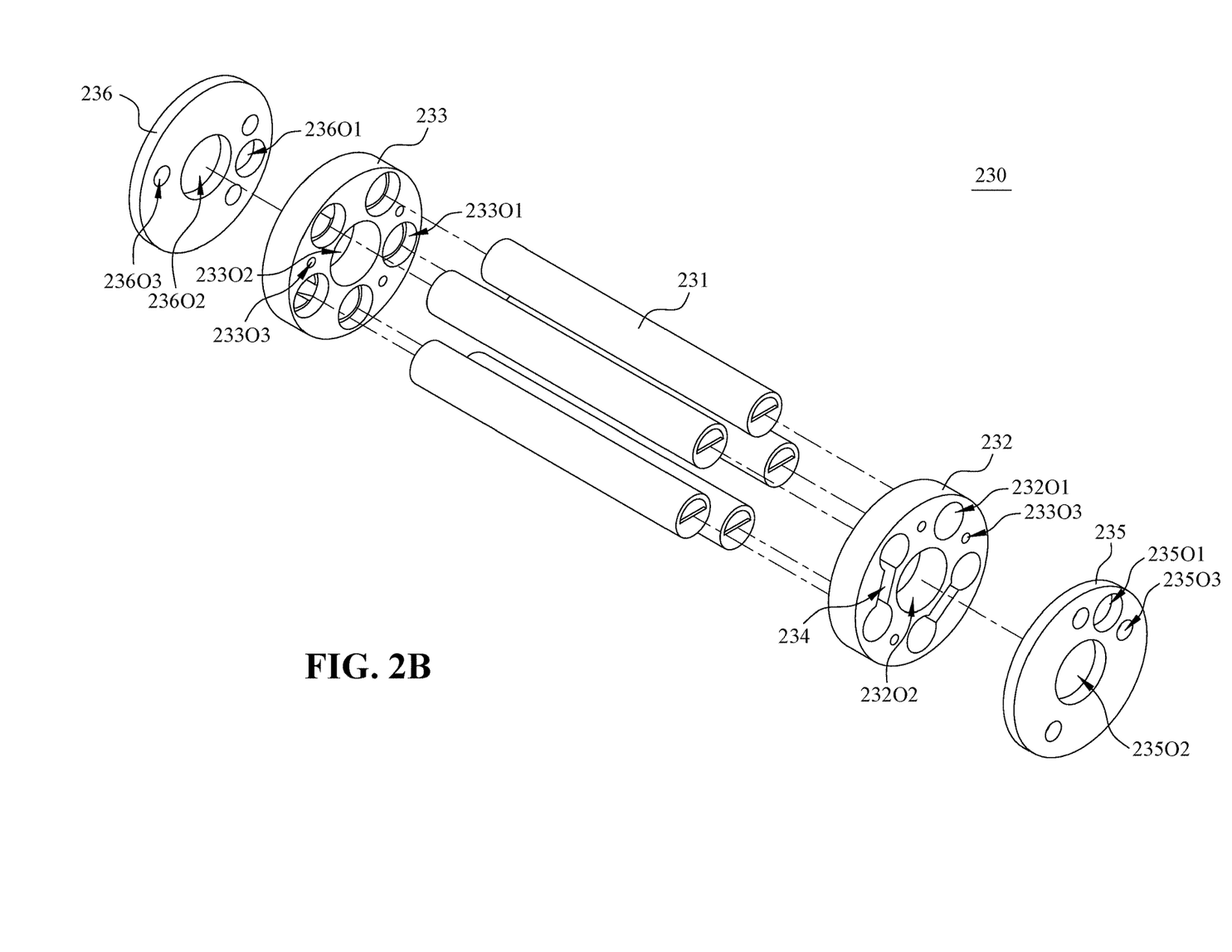

In the following dopant providing structure 200, the first dopant providing container 230 is used to provide the first dopant. Refer to FIGS. 2A and 2B, which illustrate an exemplary structure of the first dopant providing container 230. The first dopant providing container 230 includes a plurality of channel tubes 231, which are arranged in parallel to one another. The channel tubes 231 are used to contain the first dopant material. The first dopant material may be vaporized after heating, so as to provide the first dopant in gas form. In some embodiments, as shown in FIG. 2B, the two ends of each channel tube 231 may be partially closed, which is beneficial to avoid liquid overflow when the powder of the first dopant material is heated to liquid and then vaporized into gas. According to some embodiments, the number of channel tubes 231 may be an odd number, that is, 3, 5, 7, 9, 11, 13, and so on. The first dopant providing container 230 further includes two connecting elements 232 and 233, which are configured to be respectively disposed at the two ends of the channel tube 231. The connecting elements 232 and 233 form a plurality of communication pathways 234. The communication pathways 234 are used to communicate with the channel tubes 231 to form a gas channel. For example, in some embodiments, the connecting pathways 234 may sequentially connect the five channel tubes 231 to form a continuous gas channel. The channel tubes 231 and the communication pathways 234 can provide a longer heating path compared to a general crucible, and can allow more dopant materials to be placed, thereby easily generating saturated vapor, which not only can improve the limitation placed by the structure of the existing equipment on doping impurity concentration, but also ensures the stability of the reaction concentration of the dopant. In some embodiments, the channel tubes 231 and the two connecting elements 232 and 233 may be integrally formed. The first dopant providing container 230 further includes two end elements 235 and 236, which are configured to be disposed outside the two connecting elements 232 and 233, respectively. The end elements 235, 236 are formed with gas outlets. More specifically, in some embodiments, the end element 236 may have an opening 236O1, and the connecting element 233 may have an opening 233O1, both of which serve as inlets for the carrier gas to enter the channel tube 231. The connecting element 232 may have an opening 232O1, and the end element 235 may have an opening 235O1, both of which are used as the outlet for the carrier gas and the first dopant in the gas form to leave the channel tube 231. In this case, the opening 235O1 serves as the aforementioned gas outlet. According to some embodiments, the first dopant providing container 230 may further have a central channel opening 237, the channel tube 231 is disposed around the central channel opening 237, and the connecting elements 232, 233 and the end elements 235, 236 respectively have corresponding openings 232O2, 233O2, 235O2, and 236O2 to the central channel opening 237. Thus, the second carrier gas providing channel 150 can pass through the first dopant providing container 230 through the central channel opening 237, and then connect to the second dopant providing container 250. In some embodiments, the connecting elements 232, 233 and the end elements 235, 236 may further have openings 232O3, 233O3, 235O3, and 236O3, respectively, for locking the elements.

According to some embodiments, the apparatus 10 may further include a first dopant heating element H1, which is provided outside the outer tube 210 corresponding to the first dopant providing container 230 for heating the first dopant material provided in the first dopant providing container 230 to form the first dopant in gas form. The first dopant heating element H1 is, for example, a furnace having openings on two opposite sides, but is not limited thereto.

Figure 3A:
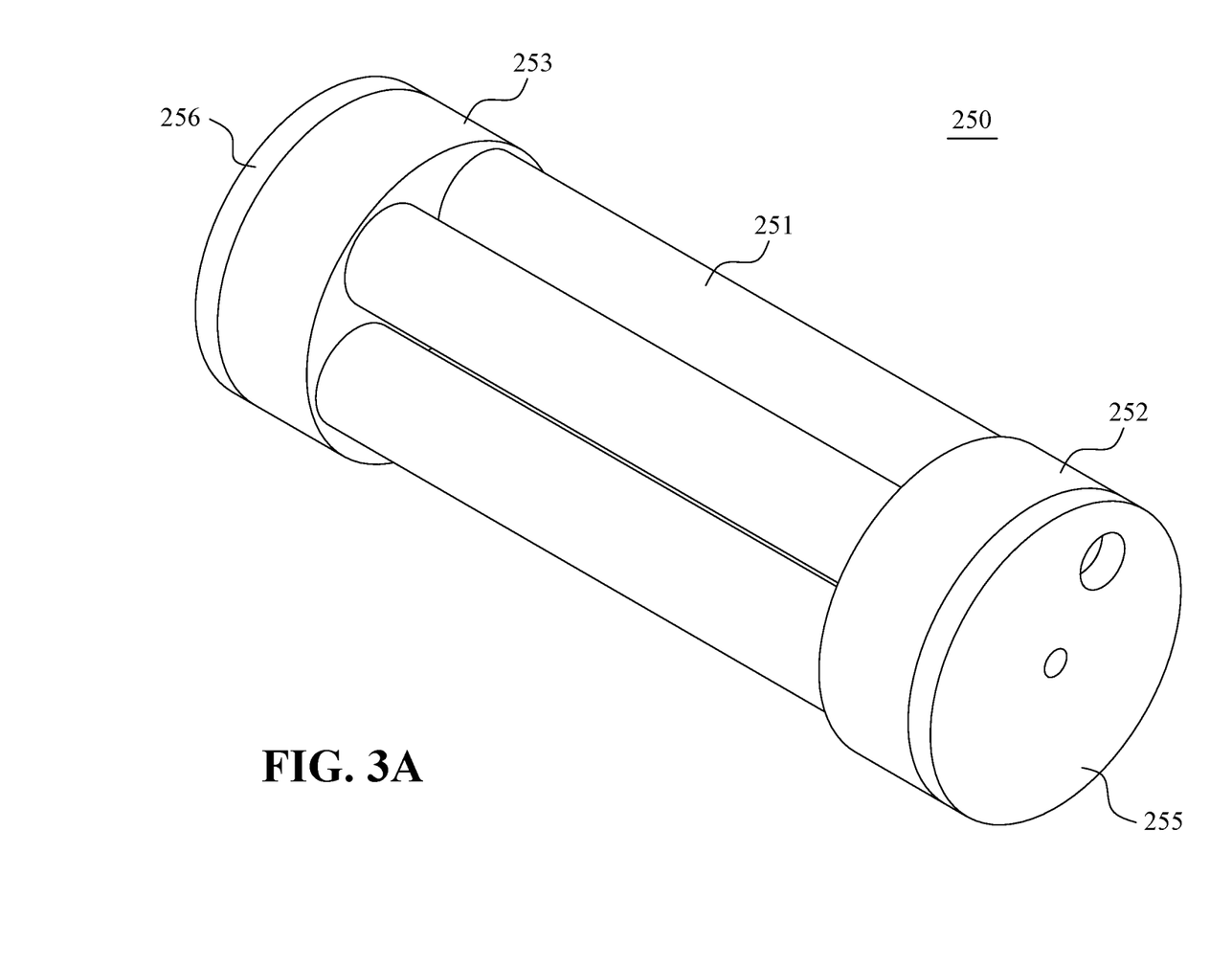
FIGS. 3A and 3B are schematic views of a second dopant providing container according to some embodiments of the present invention.
Figure 3B:
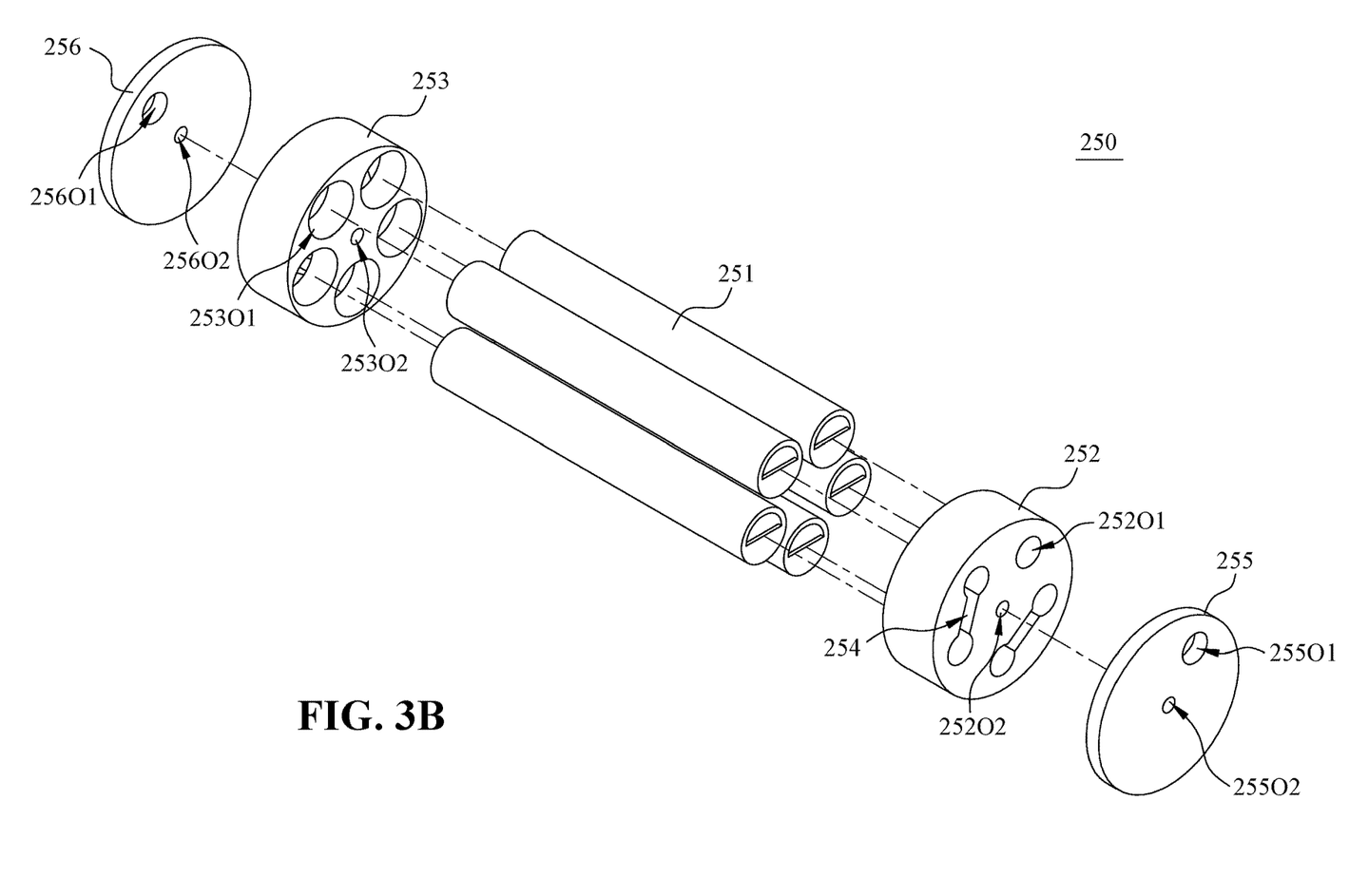

The second dopant providing container 250 is used to provide the second dopant. Refer to FIGS. 3A and 3B, which show an exemplary structure of the second dopant providing container 250. The second dopant providing container 250 includes a plurality of channel tubes 251, which are arranged in parallel with one another. The channel tubes 251 are used to contain the second dopant material. The second dopant material may be vaporized after heating to provide the second dopant in gas form. In some embodiments, as shown in FIG. 3B, the two ends of each channel tube 251 may be partially closed, which is beneficial to avoid liquid overflow when the powder of the second dopant material is heated to liquid and then vaporized into gas. According to some embodiments, the number of channel tubes 251 may be an odd number, that is, 3, 5, 7, 9, 11, 13, and so on. The second dopant providing container 250 further includes two connecting elements 252 and 253, which are configured to be respectively disposed at the two ends of the channel tube 251. The connecting elements 252 and 253 are formed with a plurality of communication pathways 254. The communication pathways 254 are used to communicate with the channel tubes 251 to form a gas channel. For example, in some embodiments, the connecting pathways 254 may sequentially connect the five channel tubes 251 to form a continuous gas channel. Compared with a general crucible, the channel tube 251 and the communication pathways 254 can provide a longer heating path, and can allow more dopant materials to be placed, thereby easily generating saturated vapor, which not only can improve the limitation placed by the structure of the existing equipment on doping impurity concentration, but also ensures the stability of the reaction concentration of the dopant. In some embodiments, the channel tubes 251 and the two connecting elements 252 and 253 may be integrally formed. The second dopant providing container 250 further includes two end elements 255 and 256, which are configured to be arranged outside the two connecting elements 252 and 253, respectively. The end elements 255, 256 are formed with gas outlets. More specifically, in some embodiments, the end element 256 may have an opening 256O1, and the connecting element 253 may have an opening 253O1, both of which serve as inlets for the carrier gas to enter the channel tube 251. The connecting element 252 may have an opening 252O1, and the end element 255 may have an opening 255O1, both of which serve as an outlet for the carrier gas and a second dopant in gas form to leave the channel tube 251 as a. In this case, the opening 255O1 serves as the aforementioned gas outlet. In some embodiments, the connecting elements 252, 253 and the end elements 255, 256 may further have openings 252O2, 253O2, 255O2, and 256O2, respectively, for locking the elements.

According to some embodiments, the apparatus 10 may further include a second dopant heating element H2, which is provided outside the outer tube 210 corresponding to the second dopant providing container 250 for heating the second dopant material provided in the second dopant providing container 250 to form the second dopant in gas form. The second dopant heating element H2 is, for example, a furnace with openings on two opposite sides, but is not limited thereto.

It can be understood that as long as the space of the apparatus and the manufacturing process of the elements allow, a third dopant providing container can be further provided according to the number of dopant types, and the carrier gas providing structure, carrier gas providing channels and dopant heating element can be also added accordingly. In the case where the third dopant providing container is provided, the second dopant providing container 250 may have the structure shown in FIGS. 2A and 2B, and the third dopant providing container may have the structure shown in FIGS. 3A and 2B. Similarly, it is also possible to further provide a fourth dopant providing container and so on.

Although not shown in FIG. 1, in some embodiments, the outer tube 210 of the dopant providing structure 200 may be further configured to be in a preheating section defined on the upstream side of the first inner tube 220 and the first dopant providing container 230, and the apparatus 10 for optical fiber manufacturing process further includes a preheating element. The preheating element is arranged outside the outer tube 210 corresponding to the preheating section to preheat the carrier gas to prevent the organic matter as the dopant from condensing or affecting the generation rate when the gas with too low temperature is introduced into the dopant providing container. The preheating section may be provided with a structure similar to the first dopant providing container 230, which is beneficial to lengthen the gas flow distance to improve the preheating efficiency of the carrier gas. The preheating element is, for example, a furnace with openings on two opposite sides, but it is not limited thereto.

In some embodiments, as shown in FIG. 1, the outer tube 210 of the dopant providing structure 200 may be further configured to define a heat preservation section R on the downstream side of the second inner tube 240, and the apparatus 10 for optical fiber manufacturing process further includes a heat preservation element H3. The heat preservation element H3 is arranged outside the outer tube 210 corresponding to the heat preservation section R, and is used to maintain the temperature of the heat preservation section R. The heat preservation element H3 is, for example, a heating element arranged below the heat preservation section R, but is not limited to this.

According to some embodiments, the apparatus 10 for optical fiber manufacturing process further includes a rotating element 400 for driving the preform forming base tube 300 to rotate.

According to some embodiments, the apparatus 10 further includes a movable heating element H4, which is disposed under the preform forming base tube 300 and capable of move back-and-forth repeatedly under the preform forming base tube 300, as shown by the double arrow A.

In some embodiments, the apparatus 10 may further include fixing elements 410 for fixing the first carrier gas providing channel 130 and the second carrier gas providing channel 150 in the outer tube 210.

The apparatus 10 for optical fiber manufacturing process according to an embodiment of the present invention is particularly suitable for manufacturing optical fiber preforms by modified chemical vapor deposition method. In practical use, the basic raw materials for forming glass, such as $SiCl_4$, $POCl_3$, $O_2$, and/or any other suitable raw materials, are provided in the raw material providing structure 100 in gas form as shown by the arrow A1 in FIG. 1, and then passed through the raw material providing channel 110 and the outer tube 210 of the dopant providing structure 200 to reach the preform forming base tube 300 and react in the preform forming base tube 300. The carrier gas for carrying the first dopant, such as He, is provided to the first carrier gas providing structure 120 as shown by arrow A2 in FIG. 1, and then through the first carrier gas providing channel 130 to reach the first inner tube 220 of the dopant providing structure 200, and then carries the first dopant in gas form to flow to the downstream side until the preform forming base tube 300, where the doping reaction proceeds. The first dopant includes, for example, Al. Correspondingly, the first dopant raw material is, for example, $AlCl_3$, but the first dopant and raw material are not limited thereto. The carrier gas for carrying the second dopant, such as He, is provided to the second carrier gas providing structure 140 as shown by arrow A3 in FIG. 1, and then through the second carrier gas providing channel 150 to reach the second inner tube 240 of the dopant providing structure 200, and carries the second dopant in gas form to flow toward the downstream side until the preform forming base tube 300, where the doping reaction proceeds. The second dopant includes Yb, for example, and correspondingly, the second dopant raw material is $Yb(TMHD)_3$, for example, but the second dopant and raw material are not limited thereto. The preform of the optical fiber is formed in the preform forming base tube 300. The remaining gas after the reaction can leave the apparatus 10 as shown by arrow A4 in FIG. 1.

In summary, the present invention provides an apparatus for optical fiber manufacturing process, in particular, an apparatus that can be applied to optical fiber manufacturing process based on doping with rare earth metals, in which the doping raw materials are directly provided in the apparatus, so as to avoid situations wherein the doping raw materials block when entering the equipment. In addition, with the design of the first dopant providing container and the second dopant providing container according to the embodiment, the limitation of the existing device structure on the doping concentration can be improved, and the stability of the reaction concentration of the dopant can be ensured. Moreover, the structure of the present invention does not need to modify existing devices or design new complex rotary seals.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. An apparatus for optical fiber manufacturing process, comprising:
   a raw material providing structure;
   a dopant providing structure, configured to be disposed at a downstream side of the raw material providing structure and be in communication with the raw material providing structure, further comprising:
   an outer tube,
   a first inner tube, configured to be disposed in the outer tube;
   a first dopant providing container, configured to be disposed in the first inner tube for providing a first dopant material;
   a second inner tube, configured to be disposed in the outer tube at a downstream side of the first inner tube; and
   a second dopant providing container, configured to be disposed in the second inner tube for providing a second dopant material;
   and a preform forming base tube, configured to be disposed at a downstream side of the dopant providing structure;
   wherein the first dopant providing container comprises:
   a plurality of channel tubes, arranged in parallel to one another, and used to contain the first dopant material;
   two connecting elements, configured to be respectively disposed at two ends of the channel tubes, the two connecting elements being formed with a plurality of communication pathways, and the communication pathways being used to communicate with the channel tubes to form a gas channel; and
   two end elements, arranged to be respectively arranged outside the two connecting elements, and the two end elements being disposed with gas outlets.

2. The apparatus for optical fiber manufacturing process according to claim 1, wherein the channel tubes and the two connecting elements are integrally formed.

3. The apparatus for optical fiber manufacturing process according to claim 1, wherein the first dopant providing container has a central channel opening, the channel tubes are arranged around the central channel opening, and the two connecting elements and the two end elements respectively have openings corresponding to the central channel opening.

4. The apparatus for optical fiber manufacturing process according to claim 1, wherein the outer tube of the dopant providing structure is further configured to define a heat preservation section on a downstream side of the second inner tube, and the apparatus for optical fiber manufacturing process further comprises
   a heat preservation element, arranged outside the outer tube corresponding to the heat preservation section, and used to maintain the temperature of the heat preservation section.

5. The apparatus for optical fiber manufacturing process according to claim 1, further comprising:
   a first dopant heating element, arranged outside the outer tube corresponding to the first dopant providing container, and used for heating the first dopant material provided in the first dopant providing container to form the first dopant material in gas form; and
   a second dopant heating element, arranged outside the outer tube corresponding to the second dopant providing container, and used for heating the second dopant material provided in the second dopant providing container to form the second dopant material in gas form.

6. The apparatus for optical fiber manufacturing process according to claim 1, further comprising:
   a rotating element, for driving the preform forming base tube to rotate; and
   a movable heating element, arranged under the preform forming base tube and able to move back and forth under the preform forming base tube.

7. The apparatus for optical fiber manufacturing process according to claim 1, wherein the manufacturing optical fiber process is a modified chemical vapor deposition method.

8. An apparatus for optical fiber manufacturing process, comprising:
   a raw material providing structure;
   a dopant providing structure, configured to be disposed at a downstream side of the raw material providing structure and be in communication with the raw material providing structure, further comprising:
   an outer tube,
   a first inner tube, configured to be disposed in the outer tube;
   a first dopant providing container, configured to be disposed in the first inner tube for providing a first dopant material;
   a second inner tube, configured to be disposed in the outer tube at a downstream side of the first inner tube; and
   a second dopant providing container, configured to be disposed in the second inner tube for providing a second dopant material;
   and a preform forming base tube, configured to be disposed at a downstream side of the dopant providing structure;
   wherein the second dopant providing container comprises:
   a plurality of channel tubes, arranged in parallel to one another, and used to contain the second dopant material;
   two connecting elements, configured to be respectively disposed at two ends of the channel tubes, the two connecting elements being formed with a plurality of communication pathways, and the communication pathways being used to communicate with the channel tubes to form a gas channel; and
   two end elements, arranged to be respectively arranged outside the two connecting elements, and the two end elements being disposed with gas outlets.

9. The apparatus for optical fiber manufacturing process according to claim 8, wherein the channel tubes and the two connecting elements are integrally formed.

10. The apparatus for optical fiber manufacturing process according to claim 8, further comprising:
- a raw material providing channel, connecting the raw material providing structure and the outer tube of the dopant providing structure;
- a first carrier gas providing structure;
- a first carrier gas providing channel, connecting the first carrier gas providing structure and the first inner tube of the dopant providing structure;
- a second carrier gas providing structure; and
- a second carrier gas providing channel, connecting the second carrier gas providing structure and the second inner tube of the dopant providing structure.

11. The apparatus for optical fiber manufacturing process according to claim 10, wherein the first carrier gas providing structure is configured to be disposed on an upstream side of the raw material providing structure, and the second carrier gas providing structure is configured to be disposed on an upstream side of the first carrier gas providing structure; the first carrier gas providing channel is configured to be arranged in the raw material providing channel, and the second carrier gas providing channel is configured to be arranged in the first carrier gas providing channel.

\* \* \* \* \*